US012071805B2

(12) United States Patent
Chao

(10) Patent No.: US 12,071,805 B2
(45) Date of Patent: Aug. 27, 2024

(54) HYDRAULIC DOOR CLOSER CAPABLE OF REDUCING OIL-PRESSURE THEREIN IN HIGH TEMPERATURE

(71) Applicant: CMECH (GUANGZHOU) LTD., Guangdong (CN)

(72) Inventor: Wei Jin Chao, Guangdong (CN)

(73) Assignee: CMECH (GUANGZHOU) LTD., Guangdong (CN)

( * ) Notice: Subject to any disclaimer, the term of this patent is extended or adjusted under 35 U.S.C. 154(b) by 243 days.

(21) Appl. No.: 17/445,040

(22) Filed: Aug. 13, 2021

(65) Prior Publication Data

US 2021/0372184 A1 Dec. 2, 2021

Related U.S. Application Data

(60) Continuation of application No. 16/399,249, filed on Apr. 30, 2019, now Pat. No. 11,091,948, which is a (Continued)

(30) Foreign Application Priority Data

Jan. 5, 2016 (CN) ......................... 201620014208.3

(51) Int. Cl.
*E05F 3/04* (2006.01)
*E05F 3/10* (2006.01)

(52) U.S. Cl.
CPC .................. *E05F 3/04* (2013.01); *E05F 3/10* (2013.01); *E05Y 2800/414* (2013.01); *E05Y 2900/132* (2013.01)

(58) Field of Classification Search
CPC ..... E05F 3/04; E05F 3/10; E05F 3/102; E05F 3/104; E05F 3/106; E05F 3/108;
(Continued)

(56) References Cited

U.S. PATENT DOCUMENTS 3,852,846 A 12/1974 Slaybaugh
4,019,220 A 4/1977 Lieberman
(Continued)

FOREIGN PATENT DOCUMENTS

DE 202010011321 U1 12/2010
EP 2248983 B1 5/2013

OTHER PUBLICATIONS

Ludewig GmbH, "Climber", Installation Instructions, 3 pages, Jul. 1, 2013.

*Primary Examiner* — William L Miller
(74) *Attorney, Agent, or Firm* — McKee, Voorhees & Sease, PLC

(57) ABSTRACT

A hydraulic door closer capable of reducing oil-pressure therein at high temperature, comprises a housing with an oil chamber, an oil storage cavity, and a piston in the housing of the hydraulic door closer. The oil storage cavity is in communication with the oil chamber; when the oil temperature increases, hydraulic oil in the oil chamber and oil storage cavity generates an increased oil pressure move the piston, whereby volume of the oil storage cavity is enlarged, such that oil from the chamber will flow into the cavity, to reduce the oil pressure of the chamber and cavity. When the oil temperature decreases, the oil pressure in the chamber and cavity is reduced, whereby the storage piston restores its original position, whereby volume of the cavity will be reduced, and the oil in the cavity flows back into the chamber. The pressure in the oil chamber is reduced when the hydraulic oil expands due to increased temperature to prevent failure of the seal and to avoid hydraulic oil leakage.

14 Claims, 4 Drawing Sheets

Related U.S. Application Data division of application No. 16/240,947, filed on Jan. 7, 2019, now Pat. No. 11,091,947, which is a continuation of application No. 15/211,075, filed on Jul. 15, 2016, now Pat. No. 10,633,902.

(58) Field of Classification Search
CPC .... E05F 3/12; E05F 3/223; F16K 1/42; E05Y 2800/414; E05Y 2900/132
USPC .............................................................. 16/51
See application file for complete search history.

(56) References Cited

U.S. PATENT DOCUMENTS

| | | | | |
|---|---|---|---|---|
| 4,148,111 | A | 4/1979 | Lieberman | |
| 4,378,612 | A | 4/1983 | Beers | |
| 4,580,365 | A | 4/1986 | Sieg | |
| 4,660,250 | A | 4/1987 | Tillman et al. | |
| 4,937,913 | A | 7/1990 | Jentsch | |
| 4,967,444 | A | 11/1990 | Körling et al. | |
| 5,535,514 | A | 7/1996 | Lucas | |
| 5,657,511 | A * | 8/1997 | Lan | F16F 9/483 16/84 |
| 6,112,368 | A | 9/2000 | Luckett | |
| 7,571,515 | B2 | 8/2009 | Fischbach et al. | |
| 7,815,023 | B2 | 10/2010 | Salutzki | |
| 8,613,126 | B2 | 12/2013 | Blockley | |
| 8,752,244 | B2 | 6/2014 | Talpe | |
| 10,370,885 | B1 | 8/2019 | Kondratuk | |
| 11,105,135 | B2 * | 8/2021 | Kondratuk | E05F 3/102 |
| 2004/0205930 | A1 | 10/2004 | Huang | |
| 2007/0256275 | A1 | 11/2007 | Winkler | |
| 2011/0252597 | A1 | 10/2011 | Burris et al. | |
| 2011/0257797 | A1 | 10/2011 | Burris et al. | |
| 2012/0318384 | A1 | 12/2012 | Sohn | |
| 2015/0121653 | A1 | 5/2015 | Bacchetti | |
| 2015/0204128 | A1 | 7/2015 | Bacchetti | |
| 2015/0233164 | A1 | 8/2015 | Bacchetti | |
| 2016/0237730 | A1 | 8/2016 | Bacchetti | |
| 2016/0362924 | A1 | 12/2016 | Fan | |

* cited by examiner

HYDRAULIC DOOR CLOSER CAPABLE OF REDUCING OIL-PRESSURE THEREIN IN HIGH TEMPERATURE

CROSS-REFERENCE TO RELATED APPLICATIONS

This is a continuation application of U.S. Ser. No. 16/399,249, filed Apr. 30, 2019, which is a divisional application of U.S. Ser. No. 16/240,947, filed Jan. 7, 2019, which is a continuation application of U.S. Ser. No. 15/211,075, filed Jul. 15, 2016, now U.S. Pat. No. 10,633,902, issued Apr. 28, 2020, which claims priority to Chinese Application Serial No. 201620014208.3, filed Jan. 5, 2016, all of which are herein incorporated by reference in their entirety.

FIELD OF THE INVENTION

The present invention relates to a field of door closer, particular to a hydraulic door closer capable of reducing oil-pressure therein at high temperature.

BACKGROUND OF THE INVENTION

People pay more attention on housing security with social progress and technical development. A door closer, usually mounted between the door and the door frame, will close the door automatically under the resilient restoring force of the door closer, ensuring that the door is returned to the original position accurately and timely after the door is open, which provides convenience in daily life.

However, the door closer in the prior art usually generates a large impact force when closing the door, whereby people are easily bumped by the door because they cannot timely dodge, or escape the closing door. Also, sometimes a big impact noise will occur when the door is closed.

In order to solve these problems, a hydraulic door closer has been used to control the door opening/closing by regulating the flow rate of hydraulic oil, whereby the process of opening/closing the door could be adjusted to adapt the requirements of users, while protecting the door and the door frame from damage.

A key factor to guarantee the normal operation of the hydraulic door closer is sealing of the door closer. When the hydraulic oil expands due to increased temperature, the sealing element inside the door closer will be squeezed, whereby the hydraulic oil may leak and the door closer may be destroyed, or some unwanted situation will occur, e.g., a gap will appear during opening/closing door, people will be bumped while closing the door, etc.

Therefore, a primary objective of the present invention is the provision of an improved hydraulic door closer which overcomes the problems of the prior art.

Another objective of the present invention is the provision of a hydraulic door closer having a hydraulic fluid compartment with a variable volume.

A further objective of the present invention is the provision of a method for controlling internal pressure of a hydraulic door closer.

These and other objectives will become apparent from the following description of the invention.

SUMMARY OF THE INVENTION

The present invention provides a hydraulic door closer capable of reducing oil-pressure therein at high temperatures. This hydraulic door closer will reduce the oil pressure inside the closer when the hydraulic oil expands due to increased temperature, so as to prevent the sealing member from being squeezed and destroyed, and avoid the leakage of hydraulic oil.

The present invention is implemented according to following technical solution:

A hydraulic door closer capable of reducing oil-pressure therein at high temperatures comprises a housing and an oil chamber therein. An oil storage cavity, configured with an oil storage apparatus, is provided in the housing of the hydraulic door closer. The oil storage cavity is in communication with the oil chamber and is filled fully with hydraulic oil. When the oil temperature increases, the hydraulic oil in the oil chamber and oil storage cavity will generate an increased oil pressure to squeeze and compress the oil storage apparatus, whereby the storage volume of the oil storage cavity will be enlarged, such that the hydraulic oil from the oil chamber will flow into the oil storage cavity, to reduce the oil pressure of hydraulic oil in the oil chamber and oil storage cavity; and when the oil temperature decreases, the oil pressure of the hydraulic oil in the oil chamber and oil storage cavity is reduced, such that the oil storage apparatus restores its original position before compression, and whereby the oil storage volume of the oil storage cavity will be reduced, and the hydraulic oil in the oil storage cavity flows back into the oil chamber.

In some specific embodiments, the oil storage cavity comprises a first oil storage cavity in communication with the oil chamber, a second oil storage cavity in communication with the first oil storage cavity, and a third oil storage cavity in communication with the second oil storage cavity. The first oil storage cavity has a diameter smaller than the diameter of the second oil storage cavity, and the second oil storage cavity has diameter smaller than the diameter of the third oil storage cavity.

Further, the oil storage apparatus is configured in the third oil storage cavity.

In some specific embodiments, the oil storage apparatus comprises a piston in airtight connection with the oil storage cavity, and a blocker connected to the oil storage cavity. A spring is positioned between the piston and the blocker. The spring has one end which is sleeved on the piston, and the other end connected to the blocker.

Further, the piston comprises a piston body configured with a first convex ring and a second convex ring having same diameters, which is smaller than a diameter of the oil storage cavity.

Further, a groove is formed between the first convex ring and the second convex ring, and a seal ring is provided in the groove.

The technical solution of the present invention has advantages as follows:

The present invention provides a hydraulic door closer capable of reducing oil-pressure therein at high temperature, wherein a oil storage cavity, configured with an oil storage apparatus, is provided in the housing of the hydraulic door closer, whereby the oil pressure in the oil chamber will be reduced effectively when the hydraulic oil expands due to increased temperature, to prevent the sealing element from being squeezed and destroyed, and to avoid the situation that the hydraulic oil may leak and destroy the door closer, and to eliminate people being bumped while closing the door.

DETAILED DESCRIPTION OF THE PREFERRED EMBODIMENTS

The present invention will be described hereinafter in details with reference to the FIGS. 1-7.

Figure 1:
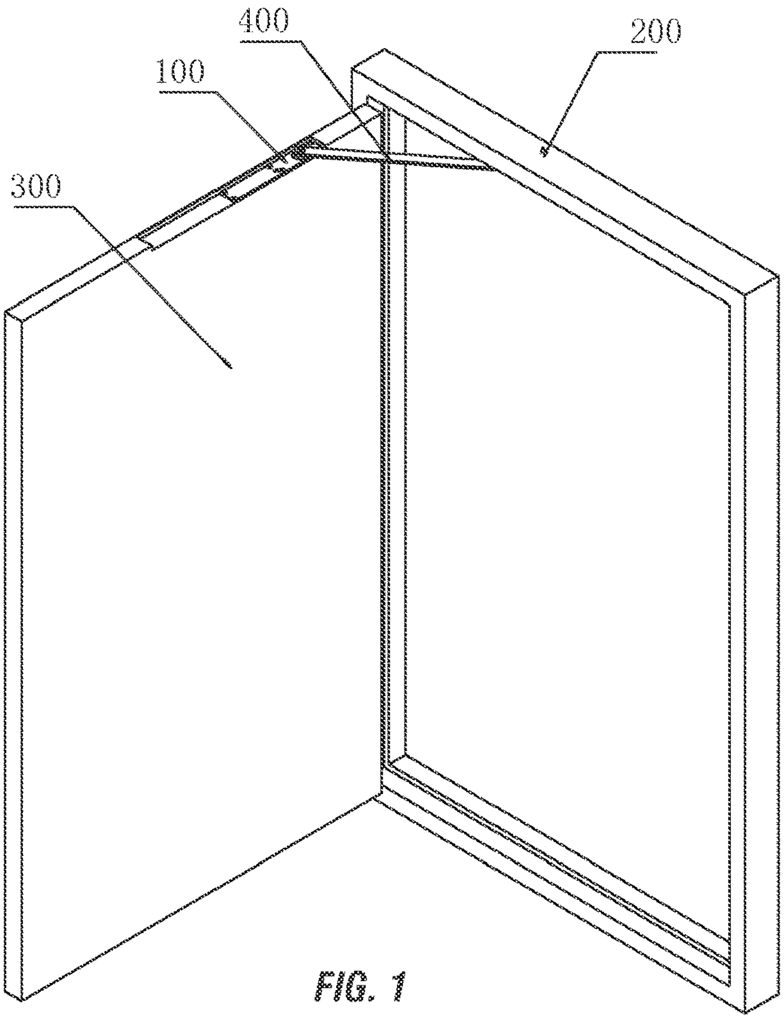
FIG. 1 is a schematic diagram illustrating an embodiment where a hydraulic door closer of the present invention is used.
Figure 2:
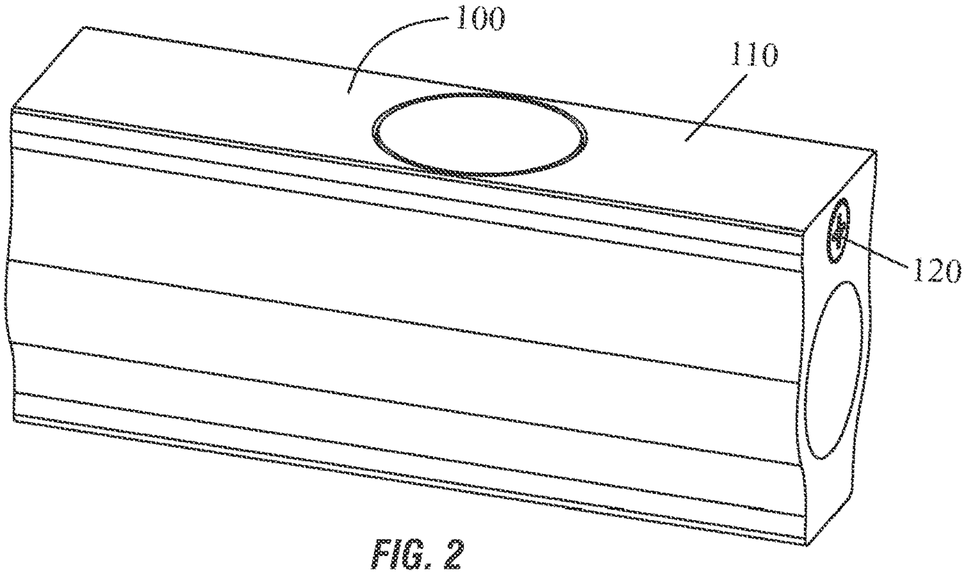
FIG. 2 is a schematic diagram of the hydraulic door closer of the present invention.
Figure 3:
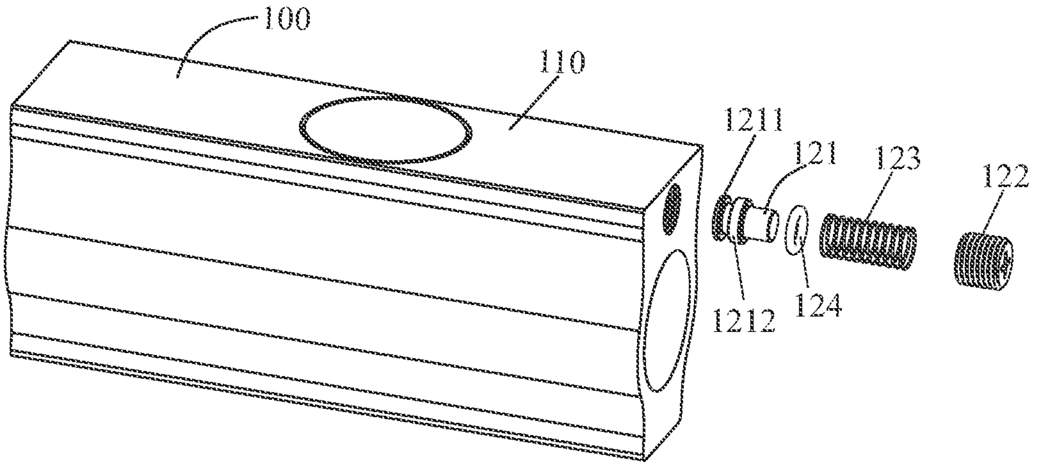
FIG. 3 is an exploded view of the hydraulic door closer components of the present invention.

As shown in FIG. 1, a hydraulic door closer 100 of the present invention capable of reducing oil-pressure therein at high temperature is mounted on the top of the door 300. The hydraulic door closer 100 includes a driving member connected to a transmission mechanism 400, which is connected to a slider mounted in the door frame 200.

When opening the door 300, the transmission mechanism 400 is driven to move under the movement of the door 300.

When the external force to the door 300 disappears, the transmission mechanism 400 is driven to move with the effect of the driving member, whereby the door 300 will be closed. The transmission mechanism 400, preferably, is in the form of a transmission rod. It should be noted that, without inducing any understanding problem, the driving member in the inside of the hydraulic door closer 100 and the slider configured on the door frame are not shown in FIG. 1.

It should be noted that it is just a preferable embodiment to arrange the hydraulic door closer 100 on the top of the door 300 and the door frame 200 in the present invention, instead of a restriction for the position of hydraulic door closer 100 of the present invention. Thus, the door closer 100 may also be mounted at the bottom of the door 300 and the door frame 200.

As shown in the figures, the hydraulic door closer 100 of the present invention comprises a housing 110 and an oil chamber 130 configured therein. One end of the transmission mechanism 400 is received in the housing 110, and the other end is connected to the door frame 200. The driving member is configured in the housing 110. It should be noted that without inducing any understanding problem, the connection between the transmission mechanism 400, the driving member and the hydraulic door closer 100 of the present invention is not shown in the figures.

An oil storage cavity 140, configured with an oil storage apparatus 120, is provided in the housing 110. The oil storage cavity 140 is in communication with the oil chamber 130 and they are filled fully with hydraulic oil.

Figure 5:
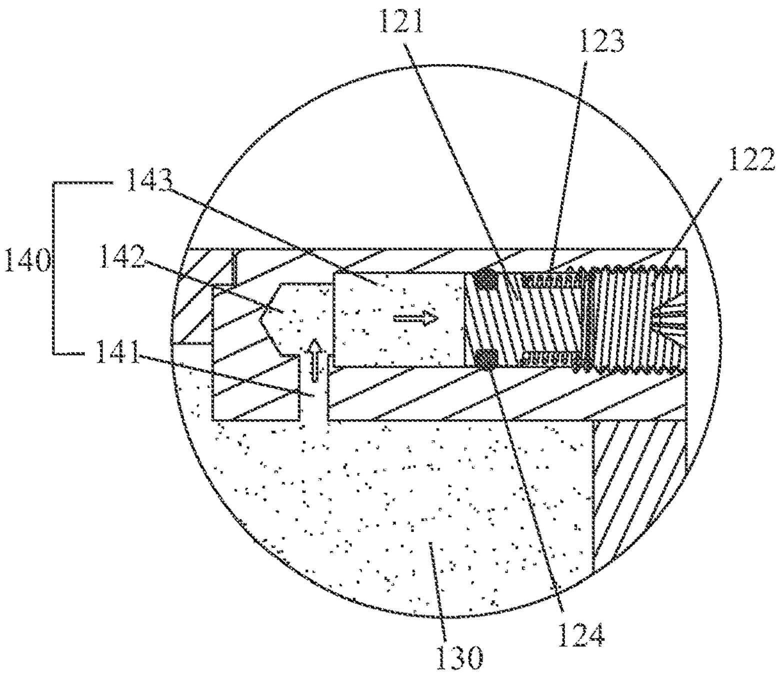
FIG. 5 is an enlarged view of portion 5-5 of FIG. 4.
Figure 7:
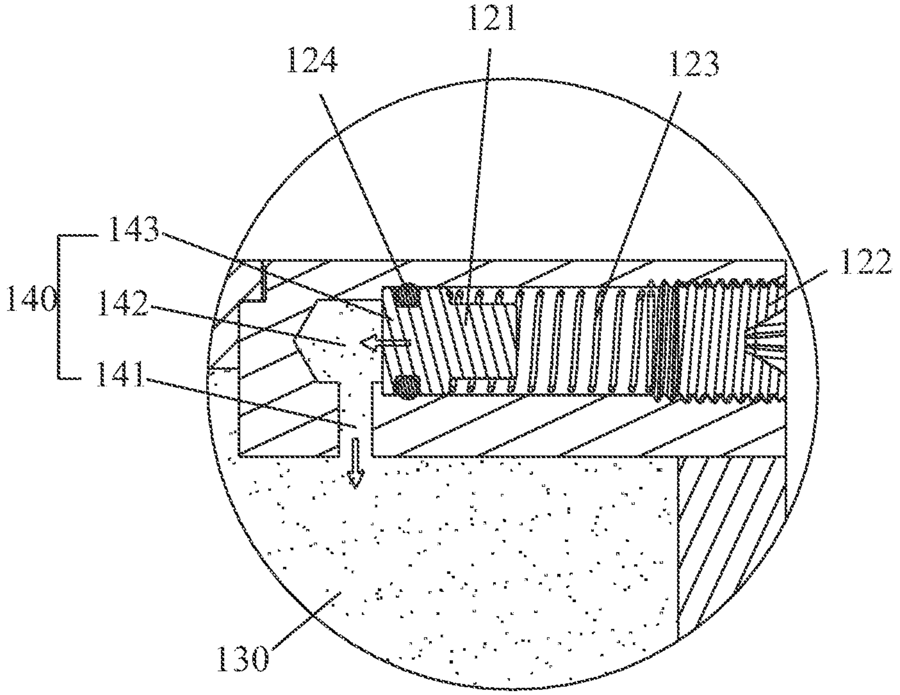
FIG. 7 is an enlarged view of portion 7-7 of FIG. 6.

As shown in FIGS. 5 and 7, the storage cavity 140 comprises a first oil storage cavity 141 in communication with the oil chamber 130, a second oil storage cavity 142 in communication with the first oil storage cavity 141, and a third oil storage cavity 143 in communication with the second oil storage cavity 142. The first oil storage cavity 141 has a diameter smaller than the diameter of the second oil storage cavity 142, and the second oil storage cavity 142 has diameter smaller than the diameter of the third oil storage cavity 143. The second oil storage cavity 142 and the third oil storage cavity 143 form a step in their junction.

The oil storage apparatus 120 is configured in the third oil storage cavity 143, and comprises a piston 121 in airtight connection with the third oil storage cavity 143 of the oil storage cavity 140, and a blocker or plug 122 threadably-connected to the oil storage cavity 140, specifically to the third oil storage cavity 143. A spring 123 is configured between the piston 121 and the plug 122. One end of the spring 123 is sleeved on the piston 121, and the other end is connected to the plug 122.

The piston 121 comprises a piston body configured with a first convex ring 1211 and a second convex ring 1212 (FIG. 3) having the same diameter, which is smaller than the diameter of the oil storage cavity 140, specifically the diameter of the second oil storage cavity 141. A seal ring 124 is provided in a groove formed between the first convex ring 1211 and the second convex ring 1212.

When the oil temperature is normal, the oil chamber 130, the first oil storage cavity 141 and the second oil storage cavity 142 are all filled fully with hydraulic oil, and the spring 123 of the oil storage apparatus 120 is in a natural state, while the piston 121 of the oil storage apparatus 120 bears against the step formed by the second and third oil storage cavities.

Figure 4:
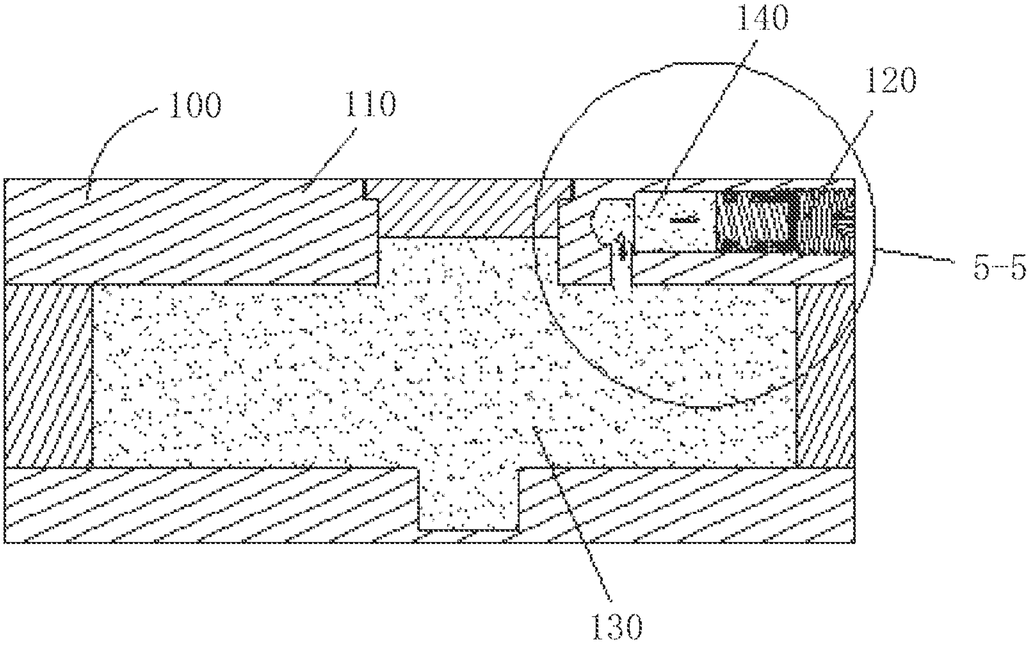
FIG. 4 is a sectional view of the hydraulic door closer of the present invention when the oil temperature increases.

As shown in FIGS. 4 and 5, when the oil temperature increases, the hydraulic oil in the oil chamber 130 and oil storage cavity 140 expands and generates an increased oil pressure to squeeze and compress the oil storage apparatus 120, whereby the storage volume of the oil storage cavity 140 will be enlarged. As seen from arrows shown in FIGS. 4 and 5, the hydraulic oil from the oil chamber 130 will flow into the oil storage cavity 140, to reduce the oil pressure of hydraulic oil in the oil chamber 130 and oil storage cavity 140. Specifically, the spring 123 is compressed, the oil storage apparatus 120 moves rightwards to make more volume of the third oil storage cavity available, which results in the flow of hydraulic oil into the third oil storage cavity under effect of oil pressure.

Figure 6:
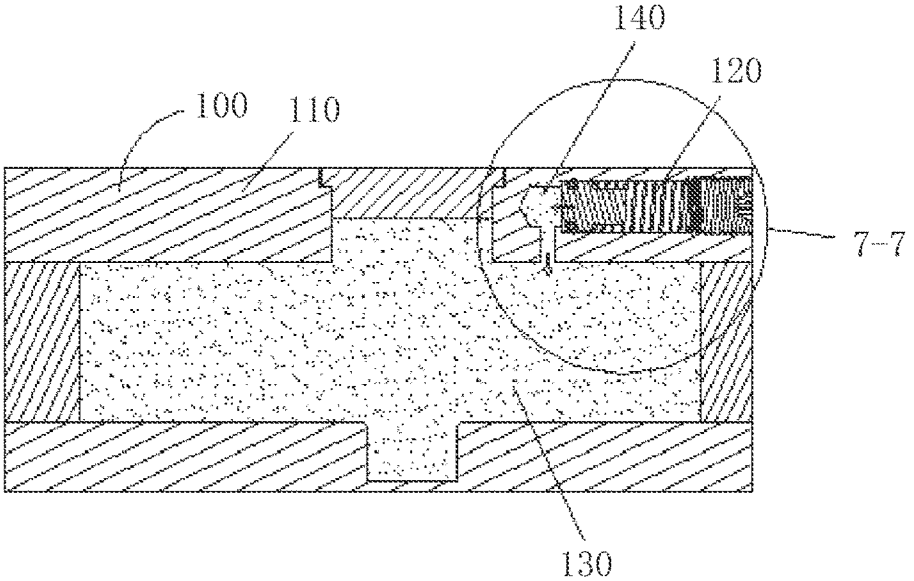
FIG. 6 is a sectional view of the hydraulic door closer of the present invention when the oil temperature decreases.

As shown in FIGS. 6 and 7, when the oil temperature decreases, the oil pressure of the hydraulic oil in the oil chamber 130 and oil storage cavity 140 is reduced, whereby the oil storage apparatus 120 restores its original position before compression, and whereby the oil storage volume of the oil storage cavity 140 will be reduced. As seen from arrows shown in FIGS. 6 and 7, the hydraulic oil in the oil storage cavity 140 flows back into the oil chamber 130. Specifically, the spring of the oil storage apparatus 120 restores to its original position before compression, the hydraulic oil will be expelled out by the oil storage apparatus 120 from the third oil storage cavity 143 into the oil chamber 130 through the second and first oil storage cavities.

The present invention provides a hydraulic door closer capable of reducing oil-pressure therein at high temperature, wherein an oil storage cavity, configured with an oil storage apparatus, is provided in the housing of the hydraulic door closer, thereby the oil pressure in the oil chamber will be reduced effectively when the hydraulic oil expands due to increased temperature. The door closer prevents the sealing element from being squeezed and destroyed, avoids the situation that the hydraulic oil may leak, the door closer may be destroyed even possible, and people will be bumped while closing the door, etc.

The embodiments described hereinbefore are merely preferred examples of the present invention, without any form of restriction for the present invention. So contents without departing from the technical solution of the present invention, any simple changes, equivalent variation and modifications based on the technical essence of the present invention fall into the protection scope of the present invention.

What is claimed is:

1. A method of controlling an internal pressure of a hydraulic door closer mounted between a door and a door frame, the closer having a fluid compartment filled with hydraulic fluid, the compartment including first, second and third cavities with sequentially increasing volumes, the method comprising:

sliding a piston in the compartment in opposite directions, so that fluid flows in opposite directions between the first, second and third cavities, as pressure of the fluid in the fluid compartment increases and decreases in response to ambient temperature increases and decreases.

2. The method of claim 1 further comprising biasing the piston in a first direction with a spring in the compartment.

3. The method of claim 2 further comprising moving the piston in a second direction opposite the first direction when fluid pressure compresses the spring.

4. The method of claim 1 further comprising maintaining a fixed volume of fluid in the compartment.

5. The method of claim 1 wherein movement of the piston changes the volume of the compartment.

6. The method of claim 1 further comprising maintaining the hydraulic fluid only on one side of the piston during operation of the door closer.

7. The method of claim 6 further comprising biasing the piston toward the one direction with a spring in the compartment.

8. The method of claim 7 further comprising moving the piston in the opposite position when fluid pressure compresses the spring.

9. A method of adjusting internal pressure of a hydraulic door closer mounted between a door and a door frame, the closer having a fluid compartment filled with hydraulic fluid, the compartment including first, second and third cavities with sequentially increasing diameters, the method comprising:

moving a piston in a first direction in response to increased fluid pressure thereby increasing the volume of the compartment and moving the piston in a second opposite direction in response to decreased fluid pressure thereby decreasing the volume of the compartment.

10. The method of claim 9 further comprising maintaining the hydraulic fluid only on one side of the piston during operation of the door closer.

11. The method of claim 9 wherein the piston moves in response to changes in ambient temperatures.

12. The method of claim 11 wherein the piston moves in the first direction when the ambient temperature increases and in the second direction when the ambient temperature decreases.

13. The method of claim 11 further comprising biasing the piston towards the first direction with a spring.

14. The method of claim 9 wherein the fluid pressure changes in response to changes in ambient temperature.

* * * * *